United States Patent [19]
Garberi et al.

[11] 4,024,232
[45] May 17, 1977

[54] METHOD OF PREPARING MAGNETITE HAVING A CONTROLLED PARTICLE SIZE, STARTING FROM FERROUS SULPHATE SOLUTIONS

[75] Inventors: Angelo Garberi, Cilavegna (Pavia); Agostino Geddo, Trecate (Novara); Gian Lorenzo Marziano; Bruno Viviani, both of Novara, all of Italy

[73] Assignee: Montedison S.p.A., Milan, Italy

[22] Filed: Feb. 24, 1975

[21] Appl. No.: 552,341

[30] Foreign Application Priority Data

Feb. 25, 1974 Italy .................................. 48633/74

[52] U.S. Cl. ............................. 423/632; 423/140; 423/152
[51] Int. Cl.² ...................................... C01G 49/02
[58] Field of Search .......... 423/632, 633, 634, 151, 423/152, 140

[56] References Cited

UNITED STATES PATENTS

| | | | |
|---|---|---|---|
| 1,392,927 | 10/1921 | Fireman | 423/633 |
| 2,939,767 | 6/1960 | Martin | 423/633 |
| 3,617,562 | 11/1971 | Cywin et al. | 423/633 |
| 3,755,554 | 8/1973 | Lailach et al. | 423/633 |

FOREIGN PATENTS OR APPLICATIONS

| | | | |
|---|---|---|---|
| 1,133,863 | 11/1968 | United Kingdom | 423/633 |
| 433,333 | 8/1935 | United Kingdom | 423/632 |

*Primary Examiner*—Oscar R. Vertiz
*Assistant Examiner*—Wayne A. Langel
*Attorney, Agent, or Firm*—Stevens, Davis, Miller & Mosher

[57] ABSTRACT

A method is disclosed for controlling the particle size of equiaxial magnetite obtained by a process for preparing same starting from ferrous sulphate solutions, characterized in that the reaction forming the magnetite is conducted in a suspension to which $\gamma$ FeO(OH) has been added in such an amount that Fe of the $\gamma$ FeO(OH) is 0.1–10% of the $Fe^{++}$ initially present in the solution.

2 Claims, No Drawings

METHOD OF PREPARING MAGNETITE HAVING A CONTROLLED PARTICLE SIZE, STARTING FROM FERROUS SULPHATE SOLUTIONS

The present invention relates to a method of controlling the particle size of equiaxial magnetite in a process for obtaining same, starting from ferrous sulphate solutions.

Processes that permit one easily to control the particle size of the magnetite obtained from ferrous sulphate solutions are not known so far. On the other hand, for certain applications—especially in the field of red pigments obtained by calcining magnetite—it is useful strictly to control the magnetite particle size: in fact, the mass tone of the red pigment is closely related to the particle dimensions, and the tinting strength is the higher, the lesser (within certain limits) the particle size dispersion.

In the event a magnetite having a controlled particle size is not available for the preparation of pigments, then it is essential after calcining to carry out burdensome operations such as grinding and, sometimes, classifying with a view to bringing the particle size back to the desired values.

Therefore the advantage of having available a magnetite whose particle size is already that of the desired red pigment is evident. In fact, if sintering phenomena during calcining are avoided, it is possible to eliminate all the succeeding grinding and classifying operations, or to render them much less burdensome.

Thus, it is an object of the present invention to provide a method that permits one to obtain equiaxial magnetite with controlled particle size, by precipitation from ferrous sulphate solutions of any origin (pickling liquid, effluents of the $TiO_2$ production process via sulphate, etc.).

This and still other objects are achieved by the present invention relating to a method for controlling the equiaxial magnetite particle size in processes for preparing said magnetite starting from ferrous sulphate solutions, such method being characterized in that the reaction forming the magnetite is conducted in a suspension to which $\gamma FeO(OH)$ has been added in such amount that the Fe of $\gamma FeO(OH)$ is 0.1–10% of the Fe++ originally contained in the solution.

It has been discovered in accordance with the present invention that in the process for preparing magnetite starting from ferrous sulphate solutions it is possible to regulate the particle size of the magnetite obtained by admixing with the ferrous sulphate solution, before magnetite precipitation, variable percentages of $\gamma FeO(OH)$.

In particular, it has been found that the average diameter of the magnetite obtained decreases as the gamma oxide percentage increases. Furthermore, the magnetite product exhibits a narrower particle size distribution and a more regular morphology.

The percentages of added gamma oxide vary from 0.1 to 10% (as Fe) with respect to the Fe++ initially present in the ferrous sulphate solution and depend on the process employed for preparing the magnetite, the desired final particle size being equal.

Magnetite can be obtained from a $FeSO_4$ solution following various procedures.

For instance, according to a process described in the co-pending Italian patent appl. No. 48632A/74 filed on Feb. 25, 1974, it is carried out in two steps.

In a first step, at a temperature between 15° and 40° C, an alkali is admixed with the ferrous sulphate solution in a stoichiometric amount sufficient to precipitate ⅔ of the Fe++ ion as ferrous hydroxide, and then, at the conclusion of the precipitation, air is blown thereinto thus oxidizing ferrous hyroxide to goethide $\alpha FeO(OH)$.

In a second step, an alkali is added to the slurry obtained in the first step, the remaining Fe++ is precipitated in the form of ferrous hydroxide, and the slurry is heated to a temperature ranging from 70° to 100° C, thus causing the formation of magnetite which is then separated from the solution.

If the method according to the present invention is applied to the aforesaid process, i.e. if some $\gamma FeO(OH)$ is added to the suspension, before the beginning of the reaction forming the magnetite, it is possible to regulate on the basis of the added product amount—the size of the magnetite obtained.

According to another process it is carried out in one step only. At first, almost all the iron present in solution is precipitated with an alkali, in the form of $Fe(OH)_2$, at a temperature ranging from 15° to 40° C, then the mass is heated to a temperature ranging from 70° to 100° C and the ferrous hydroxide is oxidized with air to magnetite; an increase of the solution redox potential and a corresponding decrease of the pH value indicate that the reaction has ended. The method of the present invention proves to be efficient also in this process; in fact the addition of a small amount of $\gamma FeO(OH)$ to the reaction mass, after heating and before oxidation, serves to regulate the dimensions of the magnetite obtained. The oxide $\gamma FeO(OH)$ may be prepared according to any method. However, it has been found that it is of particular advantage to prepare the gamma oxide according to the following procedures.

To a $FeSO_4$ solution of any concentration (preferably between 15 and 70 g/l as Fe++), containing a small amount of Mg++ ions (about 0.5 g/l), an alkali is admixed, at room temperature and with stirring, until the pH value is 9. Air is then blown thereinto and, always keeping the pH at a constant value by addition of the alkali, the precipitated hydroxides are oxidized until the solution redox potential has risen from about −800 mV to at least +10 mV. Under these conditions the precipitate exhibits a reddish-brown color and shows on X-ray analysis to be made up of $\gamma FeO(OH)$ in the form of very small crystals, as revealed also by examination under the electron microscope.

The following examples are given still better to better illustrate further advantages and characteristics of the method of the present invention.

EXAMPLE I

From a ferrous sulphate solution having 65 g/l of Fe++, and coming from the $TiO_2$ production process via sulphate, 70% of Fe++ was precipitated with $NH_4OH$ at 201 g/l and then oxidized to goethite, $\alpha FeO(OH)$. A slurry having the following composition was thus obtained:

Fe++ = 16.6 g/l; Fe′′′ (prec.) = 40.0 g/l; Fe$_{total}$ = 56.6 g/l.

By using $\alpha FeO(OH)$ thus prepared, four equiaxial magnetite preparations were carried out under the following operating conditions:

initial Fe$_{tot}$ concentration = 53 g/l
Fe$^{II}$/FE$^{III}$ ratio = 0.52
calculated Fe$^{++}$ in excess = 0.5 g/l at the conclusion of the reaction
alkali used: NH$_4$OH (201 g/l) in the stoichiometric amount required for the precipitation of Fe$^{++}$ with a 1% excess
temperature: 90° C
reaction volume: about 4 liters.

These various preparations differed from one another only in that different amounts of γ FeO(OH) were added before the starting of the reaction forming the magnetite, in such a way as not to alter either the Fe concentration or the Fe$^{II}$/Fe$^{III}$ ratio. For example, in the test in which the gamma oxide percentage was 1.33, the following was used: 3200 cc of αFeO(OH) slurry, 168 cc of titanium-free FeSO$_4$ solution having 84 g/l of Fe$^{++}$, 141 cc of slurry containing 18.6 g/l of Fe in the form of γ FeO(OH), and 24 cc of water, thus obtaining a mass exhibiting the following composition: 18.3 g/l of Fe$^{++}$, 53.34 g/l of Fe$_{total}$, Fe$^{II}$/Fe$^{III}$ = 0.52.

The gamma oxide additions are reported in Table I as percentage of Fe present in the form of γ FeO(OH) with respect to the total iron. The characteristics of the various magnetites obtained and the productivity (expressed in g of Fe per hour per liter) of the conversion to magnetite are reported in the same table.

TABLE I

| | Magnetite obtained | | | | | |
|---|---|---|---|---|---|---|
| Gamma oxide addition, % of Fe as γ | d$_{10}$ μ | numerical variancy coefficient % | Mg % | S % | Specific Surface m$^2$/g | Productivity g of Fe/h. l |
| 0.00 | 0.223 | 22.75 | 0.035 | 0.49 | 5.06 | 13.15 |
| 0.33 | 0.181 | 21.22 | 0.031 | 0.49 | 6.85 | 18.41 |
| 1.33 | 0.138 | 22.92 | 0.035 | 0.47 | 9.48 | 29.78 |
| 2.00 | 0.122 | 27.26 | 0.034 | 0.49 | 11.81 | 36.88 | d$_{10}$ = average numerical diameter

γ FeO(OH) was prepared following the procedures illustrated above. In particular, from a FeSO$_4$ solution coming from the TiO$_2$ production process via sulphate at a concentration of 20 g/l of Fe$^{++}$, the whole amount of iron was precipitated with NH$_4$OH at 201 g/l and oxidized with air, at a constant pH = 9 and at room temperature. The final slurry concentration was 18.6 g/l of precipitated Fe$^{III}$ (as gamma oxide).

EXAMPLE 2

A 6 m$^3$ reactor, provided with a heat exchange and a radial turbine stirrer, was fed with 3500 liters of a ferrous sulphate solution, coming from the TiO$_2$ production process via sulphate, purified of titanium by precipitation of same at a pH = 3.5 and by subsequent filtration, and having a concentration of 60 g/l of Fe$^{++}$.

Ferrous hydroxide Fe(OH)$_2$ was precipitated with stirring by means of an NaOH solution at 650 g/l and the reaction mass was simultaneously heated to 90° C. A slurry containing γFeO(OH), separately prepared at a concentration of 19.2 g/l of Fe$^{III}$, and in such amount that the iron therein contained constituted a predetermined percentage of the total iron, and water in such an amount that the Fe$^{III}$ concentration of the reaction mass was 50.7 g/l, were admixed with said reaction mass. Air was blown thereinto, keeping the temperature constant, and after a time period varying according to the gamma oxide amount present, the pH value decreased while the redox potential increased: when the latter reached −450 mV, the reaction was considered as concluded.

The resulting magnetite was filtered, washed and dried, and thereupon characterized. The particle size resulted depended upon the Fe percentage existing in the form of γFeO(OH) at the beginning of oxidation, as shown in Table II, in which, besides the morphological, particle size, and chemical purity characteristics of the magnetite obtained, the reaction productivity, which appears to increase as the amount of γ increases, are also reported.

TABLE II

| Addition of gamma | Magnetite obtained | | | | | |
|---|---|---|---|---|---|---|
| oxide, % of Fe as γ | d$_{10}$ μ | numerical variancy coefficient % | Mg % | S % | Specific Surface m$^2$/g | Productivity kg of Fe/h/m$^3$ |
| 0 | 0.262 | 42.57 | 0.065 | 0.19 | 3.69 | 10.5 |
| 0.4 | 0.218 | 33.035 | 0.051 | 0.28 | 5.64 | 11.3 |
| 1.2 | 0.126 | 35.94 | 0.044 | 0.24 | 10.89 | 12.5 |
| 1.7 | 0.105 | 36.02 | 0.048 | 0.22 | 12.80 | 13.6 |
| 2.0 | 0.083 | 51.21 | 0.037 | 0.19 | 14.58 | 12.3 | d$_{10}$ = numerical average diameter

What is claimed is:

1. In a process for preparing equiaxial magnetite starting from a ferrous sulphate solution comprising a first step in which ⅔ of the Fe$^{++}$ ion is precipitated as Fe(OH)$_2$ with an alkali at a temperature ranging from 15° to 40° C, said Fe(OH)$_2$ being oxidized to alpha-FeO(OH), and a second step, in which the remaining Fe$^{++}$ is precipitated as Fe(OH)$_2$ with an alkali and the slurry is heated to a temperature ranging from 70° to 100° C, thus obtaining equixial magnetite;

the improvement characterized in that in the aforesaid second step, before the heating of the slurry, gamma-FeO(OH) is added in such an amount that the Fe of the gamma-FeO(OH) is 0.1–10% of the Fe$^{++}$ initially present in the solution, the higher the percentage of gamma-FeO(OH), the lower the average diameter of the resulting magnetite.

2. In a process for preparing equiaxial magnetite starting from a ferrous sulphate solution, in which, at a temperature ranging from 15° to 40° C, the $Fe^{++}$ present in solution is precipitated with an alkali in the form of $Fe(OH)_2$, then the slurry is heated to a temperature ranging from 70° to 100° C and the ferrous hydroxide is oxidized with air to magnetite;

the improvement characterized in that after heating and before oxidation, gamma-FeO(OH) is added in such an amount that the Fe of the gamma-FeO(OH) is 0.1–10% of the $Fe^{++}$ initially present in the solution, the higher the percentage of gamma FeO(OH), the lower the average diameter of the resulting magnetite.

* * * * *